H. FISHER.
Hand Car.
3 Sheets—Sheet 1.
No. 26,263.
Patented Nov. 29, 1859.
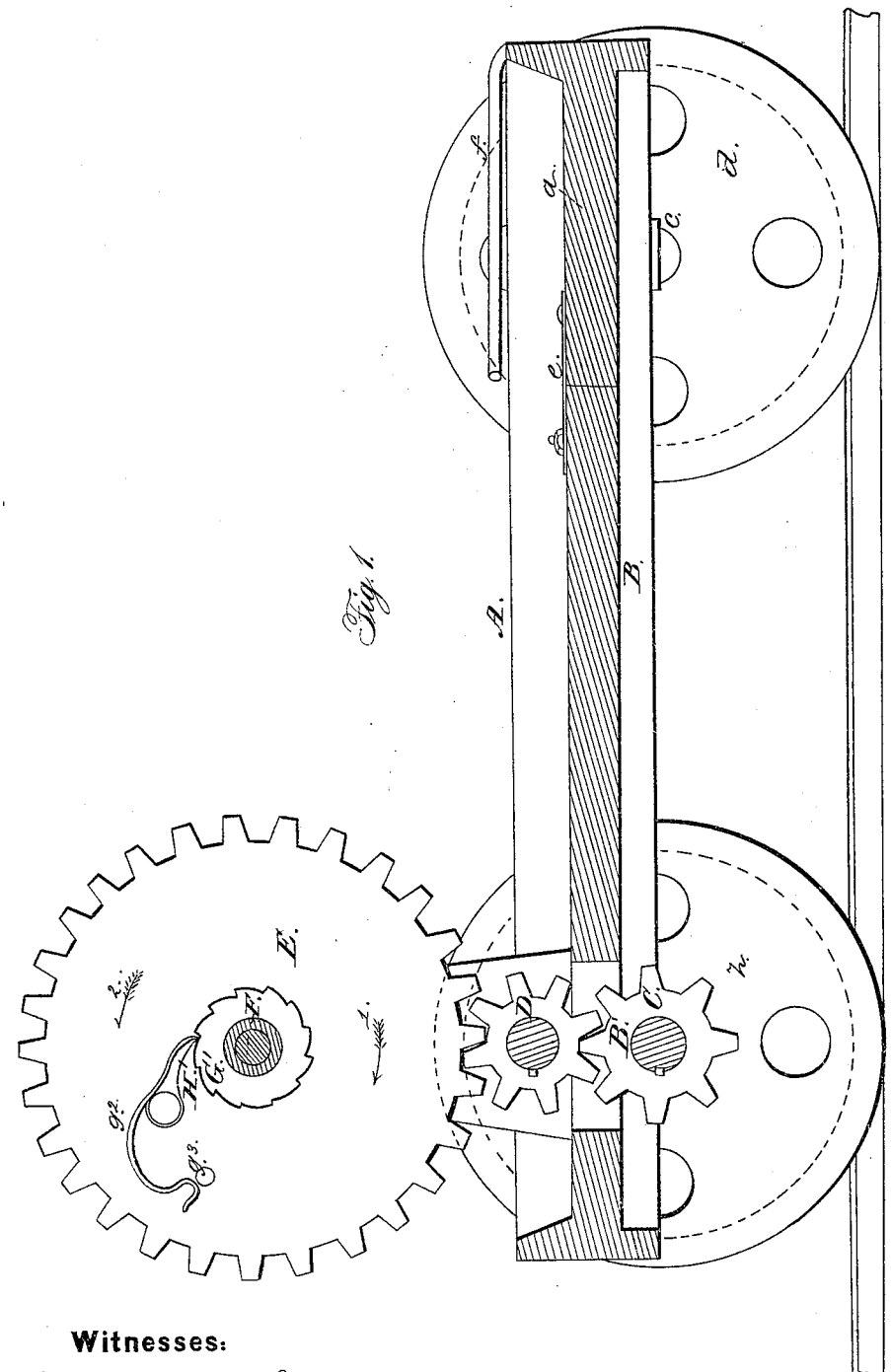
Witnesses:
Inventor:
Henry Fisher H. FISHER.
Hand Car.
No. 26,263.
3 Sheets—Sheet 2.
Patented Nov. 29, 1859.
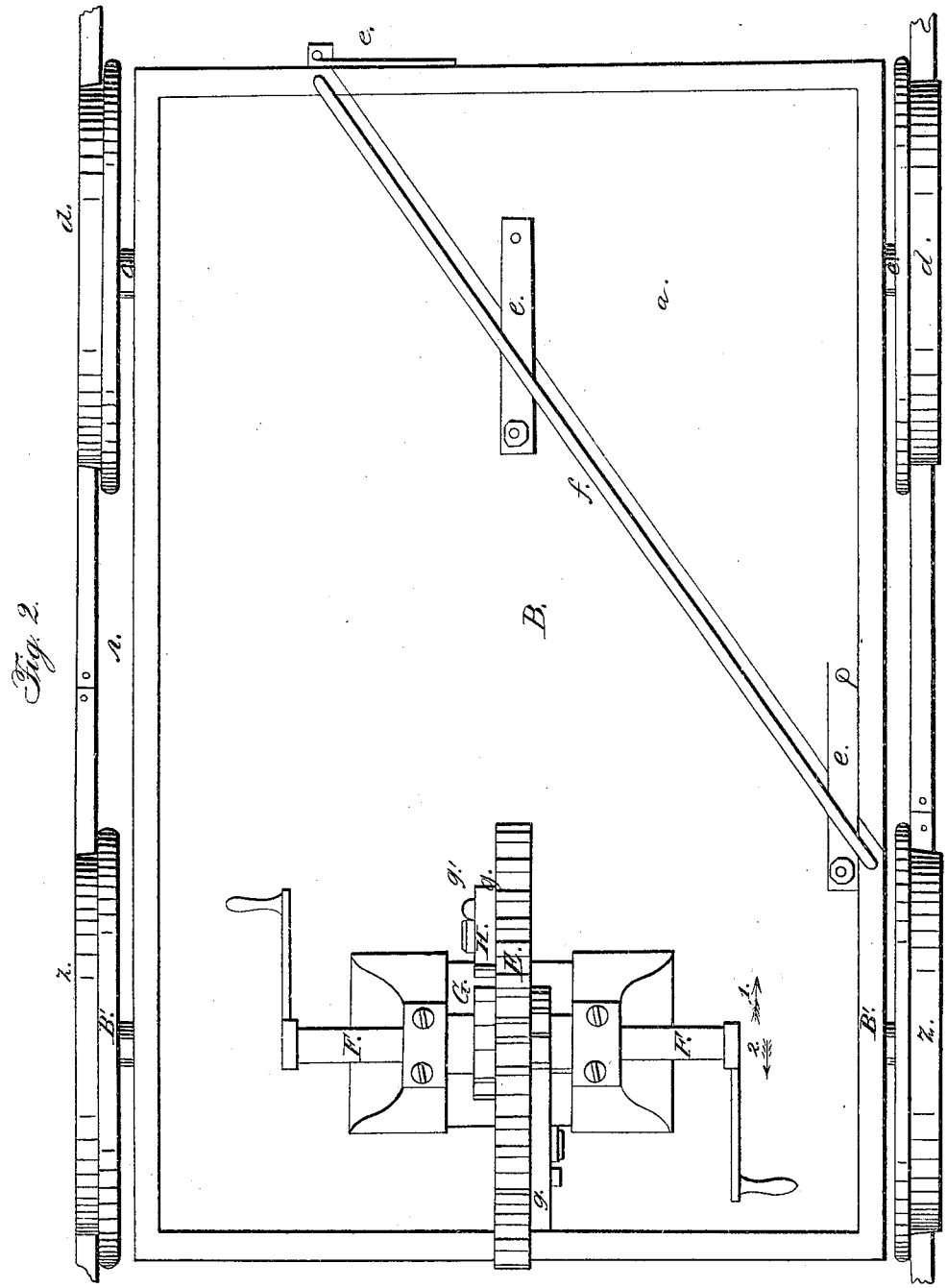
Witnesses:
Inventor:

H. FISHER.
Hand Car.
No. 26,263.
3 Sheets—Sheet 3.
Patented Nov. 29, 1859.
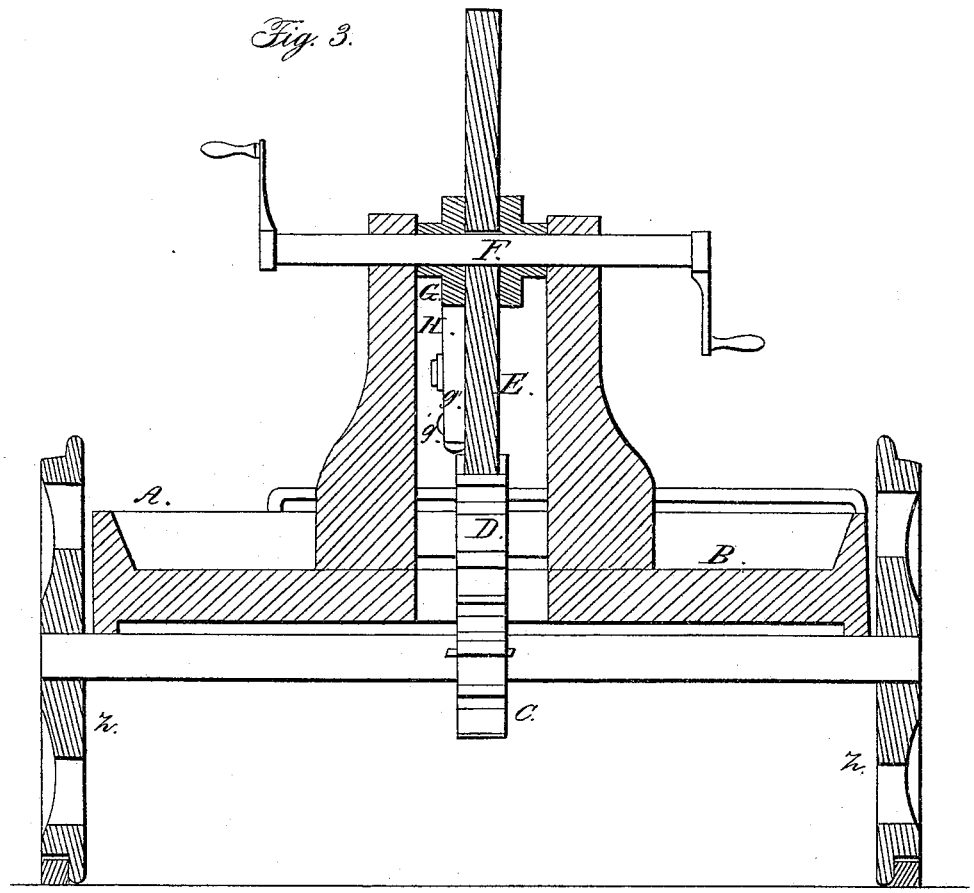
Witnesses:
Inventor:

UNITED STATES PATENT OFFICE.

HENRY FISHER, OF ALLIANCE, OHIO.

RAILROAD HAND-CAR.

Specification of Letters Patent No. 26,263, dated November 29, 1859.

*To all whom it may concern:*

Be it known that I, HENRY FISHER, of Alliance, in the county of Starke and State of Ohio, have invented a new and useful Improvement in Life-Saving Cars for Railroads; and I do hereby declare that the following is a full, clear, and exact description of the same, reference being had to the accompanying drawing, forming a part of this specification, in which—

Figure 1, is a vertical longitudinal section of a rail-road hand car with my improvement applied to it. Fig. 2, is a plan of the same. Fig. 3, is a vertical transverse section of the same.

Similar letters of reference in each of the several figures indicate corresponding parts.

The invention which I have developed is the automatic disconnection of the crank shaft from the axle of the rail-road hand cars when the cranks of said shaft meet with any obstruction, and this I accomplish by a combination with the axle of a rail-road hand car of a system of gearing operating substantially as hereinafter described.

To enable others, skilled in the art, to make and use my invention, I will proceed to describe its construction and operation.

A, represents a hand car of ordinary construction with the exception of having two short stationary hind axles and one of the corners of its platform made detachable in order to readily convert it into a three wheel car, as shown in Figs. 1 and 2. The detachable portion $a$, of the platform B, carries one of the hind axles $c$, and wheels $d$, and being held in place by means of clamps $e, e, e;$ a rail $f$, serving as a guard when the car runs on three wheels.

B′, is the front axle. It is arranged to revolve and is furnished with two wheels $z$, which are secured fast so as not to revolve independently of the axle.

C, D, E, are three toothed wheels for imparting a rotary motion to the front axle. The pinion C, is keyed fast on the axle B′, at the center of the same. The pinion D, has an independent revolving shaft arranged just high enough above the axle to allow the teeth of C, to gear with the teeth of D. The large spur-wheel E, is arranged loosely on a hand crank-shaft F, and its teeth gear with the teeth of pinion D, all as represented.

From the above description, it will be evident that motion in the car axle can not be produced, even if the crank shaft is turned, so long as the wheel E, is not connected with the shaft F. Now to produce motion in the car axle by the wheel E, thus arranged loosely on the shaft, I arrange a ratchet wheel G, fast on the shaft F, at one side of the wheel E, and to the side of the wheel E, I attach a spring pawl H, said pawl being hung so as to be adjusted to positions which will bring it in gear with the teeth of the ratchet, or throw it out of gear with the same. To the back of the pawl, a hook shaped spring $g$, is attached, the hook of the spring falling under a pin $g'$, when the pawl is in gear with the ratchet, and over the pin when the pawl is out of gear with the same. When the pawl H, is in gear with the ratchet wheel G, and the hand crank shaft, F, turned in the direction of the arrow 1, the wheel E, will turn with the crank shaft and thus impart motion to the pinions C, D, and car axle B′. But if the cranks of the shaft F, in their revolution catch into the clothes of the operators or are retarded by any cause, the wheel E, will continue its forward motion independently of the crank shaft, for the pawl H, will slip over the backs of the ratchet teeth and thus instead of the cranks, under these circumstances, going round with the wheel E, and sweeping the operators off the platform; they will become inactive and remain at rest; the connection between the crank shaft and the wheel E, having been broken.

In order to produce motion in the car axle with the loose wheel E, when the crank shaft F is turned backward or in the direction of arrow 2, a ratchet G′, and spring pawl H′, hook spring $g^2$, and stop pin $g^3$, are provided on the opposite side of the wheel E; the same being set just the reverse of the pawl and ratchet G, H. And to insure greater security against the frequent sweeping of the operators off of the platform of the car onto the track to be killed or maimed, the crank axle might be made in two parts and one part fitted over the other and geared to the same by pawls and ratchets after the manner in which the wheel E, and shaft F, are connected and disconnected, so that notwithstanding the fact that one of the operators continues to turn one of the cranks, the other will remain at rest.

What I claim as my invention and desire to secure by Letters Patent, is:

The manner, substantially as herein described of combining the hand crank shaft F, with the axle of a rail-road hand car so that when the crank shaft F, meets with any obstruction it disconnects automatically from the axle and ceases its revolution with the same and thus prevents a sweeping off of the operators from the platform, as set forth.

The above specification of my impt. in life preserving rail cars, is hereby signed by me this 31st day of October 1859.

HENRY FISHER.

Witnesses:
 GOODWIN Y. AT LEE,
 GUSTAV DIETERICH.